United States Patent
Mathada et al.

(10) Patent No.: US 11,392,788 B2
(45) Date of Patent: Jul. 19, 2022

(54) OBJECT DETECTION AND IDENTIFICATION

(71) Applicant: INTERNATIONAL BUSINESS MACHINES CORPORATION, Armonk, NY (US)

(72) Inventors: Prasanna Alur Mathada, Bangalore (IN); Shwetha Gopalakrishna, Banagalore (IN); Sudhakar T. Seshagiri, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 149 days.

(21) Appl. No.: 16/460,286

(22) Filed: Jul. 2, 2019

(65) Prior Publication Data

US 2020/0293820 A1 Sep. 17, 2020

Related U.S. Application Data

(63) Continuation of application No. 16/354,240, filed on Mar. 15, 2019, now Pat. No. 11,354,534.

(51) Int. Cl.
*G06T 7/11* (2017.01)
*G06V 20/00* (2022.01)
(Continued)

(52) U.S. Cl.
CPC ......... *G06K 9/6228* (2013.01); *G06K 9/6217* (2013.01); *G06K 9/6293* (2013.01);
(Continued)

(58) Field of Classification Search
CPC ......... G06T 1/0021; G06T 2207/20164; G06T 7/11; G06F 3/0482; G06Q 30/0269;
(Continued)

(56) References Cited

U.S. PATENT DOCUMENTS 9,195,819 B2 11/2015 Hudson
9,386,339 B2 7/2016 Livesey
(Continued)

OTHER PUBLICATIONS

Xue et al., Deep Texture Manifold for Ground Terrain Recognition, Apr. 3, 2018 [retrieved Jun. 24, 2021], Cornell University, v2, 10 pages. Retrieved: https://arxiv.org/abs/1803.10896 (Year: 2018).*

(Continued)

*Primary Examiner* — Matthew C Bella
*Assistant Examiner* — Dennis Rosario
(74) *Attorney, Agent, or Firm* — Elliot J. Shine

(57) ABSTRACT

An embodiment of the invention may include a method, computer program product and computer system for object detection and identification. The method, computer program product and computer system may include computing device which may receive an image from a user device. The image may be a screenshot captured by the user device from a display. The computing device may classify the image based on features present in the image and detect a salient object contained within the image. The computing device may identify the object in the image and one or more sources of the object in the image.

8 Claims, 7 Drawing Sheets

(51) Int. Cl.

| | |
|---|---|
| *G06Q 30/02* | (2012.01) |
| *G06K 9/62* | (2022.01) |
| *G06N 3/08* | (2006.01) |
| *G06T 11/60* | (2006.01) |
| *G06V 20/40* | (2022.01) |
| *G06Q 30/06* | (2012.01) |

(52) U.S. Cl.
CPC .......... *G06N 3/08* (2013.01); *G06Q 30/0261* (2013.01); *G06Q 30/0643* (2013.01); *G06T 7/11* (2017.01); *G06T 11/60* (2013.01); *G06V 20/35* (2022.01); *G06V 20/41* (2022.01); *G06V 20/46* (2022.01); *G06Q 30/02* (2013.01); *G06Q 30/0267* (2013.01)

(58) Field of Classification Search
CPC .... G06Q 30/02; G06Q 30/06; G06Q 30/0641; G06Q 30/0631; G06Q 30/0601; G06Q 30/0643; G06Q 20/12; G06Q 20/40; G06Q 30/0201; G06Q 50/01; G06Q 20/20; G06Q 30/0267; G06Q 30/0261; H04N 5/23293; G06K 9/00671; G06K 9/4671; G06K 9/4676; G06V 20/35
See application file for complete search history.

(56) References Cited

U.S. PATENT DOCUMENTS

| | | | |
|---|---|---|---|
| 9,524,524 | B2 | 12/2016 | Calman |
| 10,091,654 | B2 | 10/2018 | Kim |
| 10,475,145 | B1 | 11/2019 | Lester |
| 2007/0150360 | A1 | 6/2007 | Getz |
| 2008/0226129 | A1* | 9/2008 | Kundu ............ G08B 13/19673 382/103 |
| 2011/0291925 | A1 | 12/2011 | Israel |
| 2012/0311623 | A1 | 12/2012 | Davis |
| 2014/0080428 | A1 | 3/2014 | Rhoads |
| 2014/0226900 | A1 | 8/2014 | Saban |
| 2014/0250110 | A1* | 9/2014 | Yang .................... G06F 16/583 707/723 |
| 2015/0215674 | A1 | 7/2015 | Provencher |
| 2017/0206579 | A1* | 7/2017 | Jung .................... G06Q 10/083 |
| 2017/0270582 | A1 | 9/2017 | Forss |
| 2018/0197223 | A1 | 7/2018 | Grossman |
| 2019/0294932 | A1* | 9/2019 | Rodriguez ......... G06K 9/00993 |
| 2020/0027244 | A1 | 1/2020 | Ueda |
| 2020/0079412 | A1* | 3/2020 | Ramanathan .... G08B 13/19608 |
| 2020/0293819 | A1* | 9/2020 | Mathada ................. G06T 11/60 |

OTHER PUBLICATIONS

Oramas et al., Multi-Label Music Genre Classification From Audio, Text, and Images Using Deep Features, Jul. 16, 2017 [retrieved Jun. 24, 2021], Cornell University, v1, 8 pages. Retrieved: https://arxiv.org/abs/1707.04916 (Year: 2017).* https://algorithmia.com/algorithms/deeplearning/SalNet/docs, "SalNet: Deep Convolutional Networks for Saliency Prediction— Algorithmia", deeplearning (/users /deeplearning) / SalNet / 0.2.2, Copyright 2019 Algorithmia, 1 page.

Mell et al., "The NIST Definition of Cloud Computing", Recommendations of the National Institute of Standards and Technology, Special Publication 800-145, Sep. 2011, 7 pages.

IBM: List of IBM Patents or Patent Applications Treated as Related (Appendix P), Jan. 20, 2020, pp. 1-2.

U.S. Appl. No. 16/354,240, entitled "Object Detection and Identification", filed Mar. 15, 2019, 46 Pages.

Huang et al., "Unconstrained Multimodal Multi-Label Learning," IEEE Transactions on Multimedia, vol. 17, Issue: 11, Nov. 2015 pp. 1923-1935.

* cited by examiner

OBJECT DETECTION AND IDENTIFICATION

BACKGROUND

The present invention relates generally to a method, system, and computer program for object detection and identification. More particularly, the present invention relates to a method, system, and computer program for detecting an object contained within an image and identifying the object along with sources of the object.

Humans are capable of looking at an image or watching a video and readily identifying, people, objects, scenes, and other visual details. Object recognition has become an ever increasingly important facet of modern technology. Object recognition, with respect to technology, is a computer vision technique for identifying objects in images or videos. Object recognition techniques may use various means to identify objects such as deep learning and machine learning algorithms. Further, object recognition techniques may be combined with object detection techniques. Object detection and object recognition are similar techniques for identifying objects, but they vary in their execution. Object detection is the process of finding instances of objects in images. In the case of deep learning, object detection is a subset of object recognition, where the object is not only identified but also located in an image. This allows for multiple objects to be identified and located within the same image.

BRIEF SUMMARY

An embodiment of the invention may include a method, computer program product and computer system for object detection and identification. The method, computer program product and computer system may include computing device which may receive an image from a user device. The image may be a screenshot captured by the user device from a display. The computing device may classify the image based on features present in the image and detect a salient object contained within the image. The computing device may identify the object in the image and one or more sources of the object in the image.

BRIEF DESCRIPTION OF THE DRAWINGS

FIG. 1b illustrates example operating modules of the object detection and identification program of FIG. 1a.

DETAILED DESCRIPTION

Figure 1A:
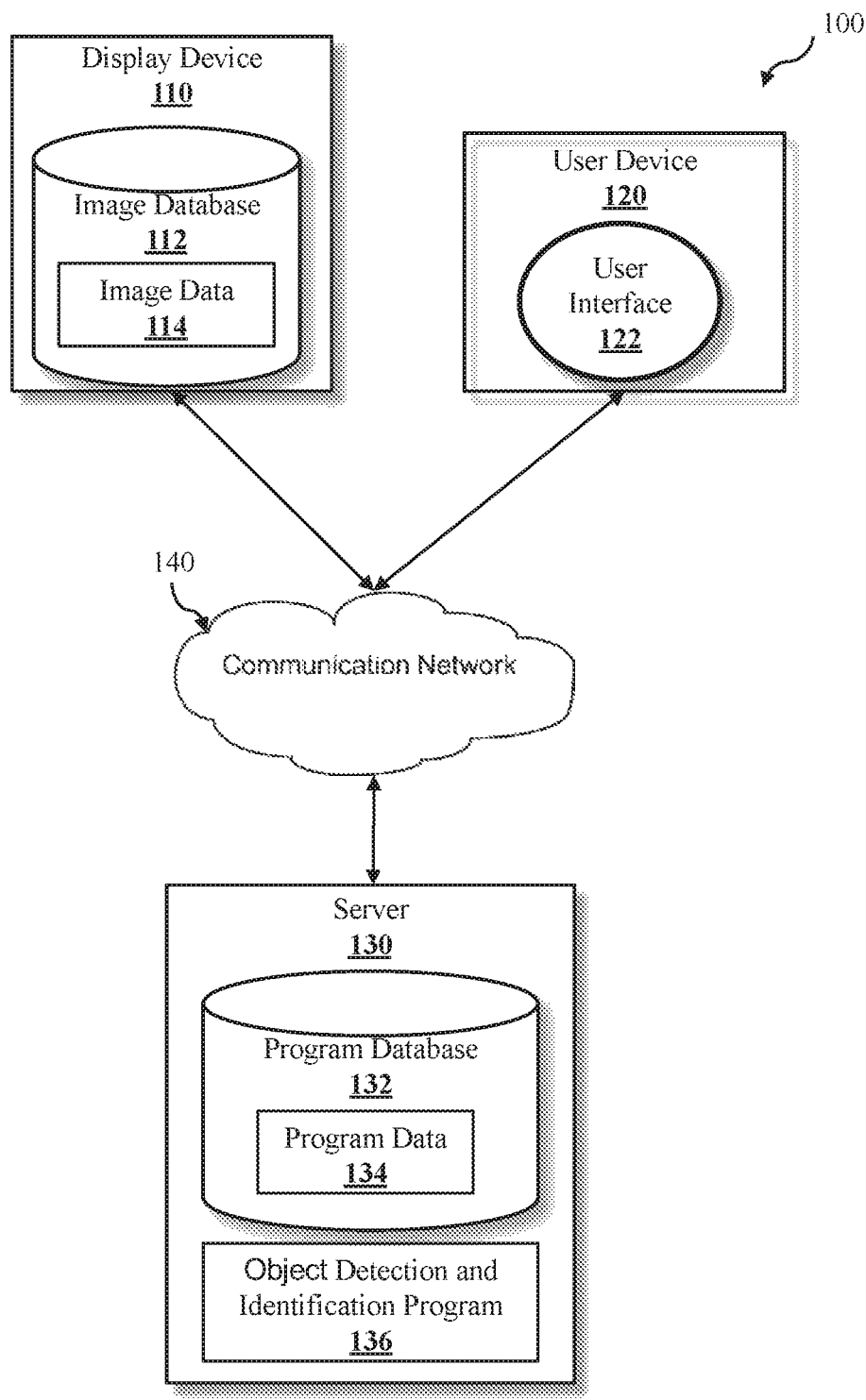
FIG. 1a illustrates a system for object detection and identification, in accordance with an embodiment of the invention.

Embodiments of the present invention will now be described in detail with reference to the accompanying Figures.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Advertisements for products are ubiquitous in today's society with various products being advertised on billboards, commercials, and digital ads on the internet and IOT applications, etc. Further, products are also advertised using product placement wherein products are incorporated into television programs and movies, etc. Product placements may range from unobtrusive appearances within an environment to prominent integration and acknowledgement of the product within the work. Products included in product placements may include automobiles, consumer electronics, clothing, personal accessories, shoes, jewelry, and food, just to name a few. Thus, there may be instances wherein a consumer views a television program or movie and sees a product they may like and wish to acquire.

Embodiments of the present invention provide a method, computer program, and computer system for detecting an object contained within an image and identifying the object along with sources of the object and/or sources related to the object. Embodiments of the present invention also provide a method, computer program, and computer system for displaying an object on an image of the user and providing a means for purchasing, renting, borrowing, or otherwise acquiring the object. More particularly, embodiments of the present invention receive an image from a display, analyze the image for retail or non-retail objects and generate a list of sources of the retail or non-retail objects for presentation to a user. Advantages of the invention over current technology include saliency detection of objects within images, delamination of retail objects and non-retail objects, multiple source identification based on location of a user, image creation of the user with the identified objects, and object acquisition verification using a biometric sensor.

Reference will now be made in detail to the embodiments of the present invention, examples of which are illustrated in the accompanying drawings, wherein like reference numerals refer to like elements throughout. Embodiments of the invention are generally directed to a system for object detection and identification.

FIG. 1 illustrates an object detection and identification system 100, in accordance with an embodiment of the invention. In an example embodiment, object detection and identification system 100 includes a display device 110, a user device 120, and server 130, interconnected via network 140.

In the example embodiment, the network 140 is the Internet, representing a worldwide collection of networks and gateways to support communications between devices connected to the Internet. The network 140 may include, for example, wired, wireless or fiber optic connections. In other embodiments, the network 140 may be implemented as an intranet, a local area network (LAN), or a wide area network (WAN). In general, the network 140 can be any combination of connections and protocols that will support communications between the display device 110, the user device 120, and the server 130.

The display device 110 may include the image database 112. The display device 110 may be any device capable of displaying the image data 114. The image data 114 may include, but is not limited to, visual, audio, and/or textual data. For example, the display device 110 may display video or images, or both, such as, but not limited to, television programs, commercials, movies, pictures, billboards, digital ads, notices, announcements, and advertisements, etc. Further, the image data 114 may be, but is not limited to screenshots of the visual, audio, and/or textual data. The video and images displayed by the display device 110 may also contain textual data, such as, but not limited to, object names, object source identifiers, and object brand names, etc. In the example embodiment, the display device 110 may be a television, a movie screen, a projector, a camera, a computer, a tablet, a thin client, a cellphone, or any other device capable of displaying visual, audio, and/or textual data and sending that visual, audio, and/or textual data to and from other computing devices, such as the user device 120, and the server 130 via the network 140. The display device 110 is described in more detail with reference to FIG. 3.

The image database 112 may store the image data 114, i.e. the visual, audio, and/or textual data, being displayed by the display device 110. The image database 112 may be any storage media capable of storing data capable of storing data, such as, but not limited to, storage media resident in the display device 110 and/or removeable storage media. For example, the image database 112 may be, but is not limited to, a hard drive, a solid stated drive, a USB drive, or a memory card, etc. The image database 112 is described in more detail above and with reference to FIG. 3.

The user device 120 may include the user interface 122. In the example embodiment, the user device 120 may be a cellphone, desktop computer, a notebook, a laptop computer, a tablet computer, a thin client, or any other electronic device or computing system capable of storing compiling and organizing audio, visual, or textual content and receiving and sending that content to and from other computing devices, such as the display device 110, and the server 130 via the network 140. While only a single user device 120 is depicted, it can be appreciated that any number of user devices may be part of the object detection and identification system 100. In embodiments of the invention, the display device 110 and the user device 120 may be the same device. For example, a user may watch a television program or a movie on the user device 120, e.g. their cellphone or computer, and capture images of the television program or movie from the user device 120, e.g. their cellphone or computer. In some embodiments, the user device 120 includes a collection of devices or data sources. The user device 120 is described in more detail with reference to FIG. 3.

The user interface 122 includes components used to receive input from a user on the user device 120 and transmit the input to the object detection and identification program 136 residing on server 130, or conversely to receive information from the object detection and identification program 136 and display the information to the user on user device 120. In an example embodiment, the user interface 122 uses a combination of technologies and devices, such as device drivers, to provide a platform to enable users of the user device 120 to interact with the object detection and identification program 136. In the example embodiment, the user interface 122 receives input, such as but not limited to, textual, visual, or audio input received from a physical input device, such as but not limited to, a keypad and/or a microphone. For example, the user interface 122 may include, but is not limited to, a button or an image of a button, which the user may touch to capture a screenshot of the image data 114 displayed in the display device 110.

The server 130 may include the program database 132 and the object detection and identification program 136. In the example embodiment, the server 130 may be a desktop computer, a notebook, a laptop computer, a tablet computer, a thin client, or any other electronic device or computing system capable of storing compiling and organizing audio, visual, or textual content and receiving and sending that content to and from other computing devices, such as the display device 110, and the user device 120 via network 140. In some embodiments, the server 130 includes a collection of devices, or data sources, in order to collect the program data 134. The server 130 is described in more detail with reference to FIG. 3.

The program database 132 may store the program data 134. The program database 132 may be any storage media capable of storing data, such as, but not limited to, storage media resident in the server 130 and/or removeable storage media. For example, the program database 132 may be, but is not limited to, a hard drive, a solid stated drive, a USB drive, or a memory card, etc. The program database 132 is described in more detail above and with reference to FIG. 3.

The program data 134 may be a collection of audiovisual content including, but not limited to, audio, visual, and textual content. The program data 134 may be, for example, the image data 114 received and/or collected from the display device 110 and the user device 120. Further, the program data 134 may include user data such as, but not limited to, a user's identification, a user's phone number, a user's address, a user's preferences, a list of the user device 120 associated with a user, and the history of user interactions with the object detection and identification program 136, and photographs of the user, etc. The program data 134 is located on the server 130 and can be accessed via the network 140. In accordance with an embodiment of the invention, the program data 134 may be located on one or a plurality of servers 130.

The object detection and identification program 136 is a program capable of receiving the image data 114 captured by the user device 120 and analyzing the image data 114 to detect and identify objects contained within the image data 114. In some embodiments of the invention, the object detection and identification program 136 may generate an image of an identified object on the user. Further, embodiments of the object detection and identification program 136 may also detect a user's location, identify sources of any identified object, and facilitate the acquisition of any identified object. The object detection and identification program 136 is described in more detail below with reference to FIG. 1b.

Figure 1B:
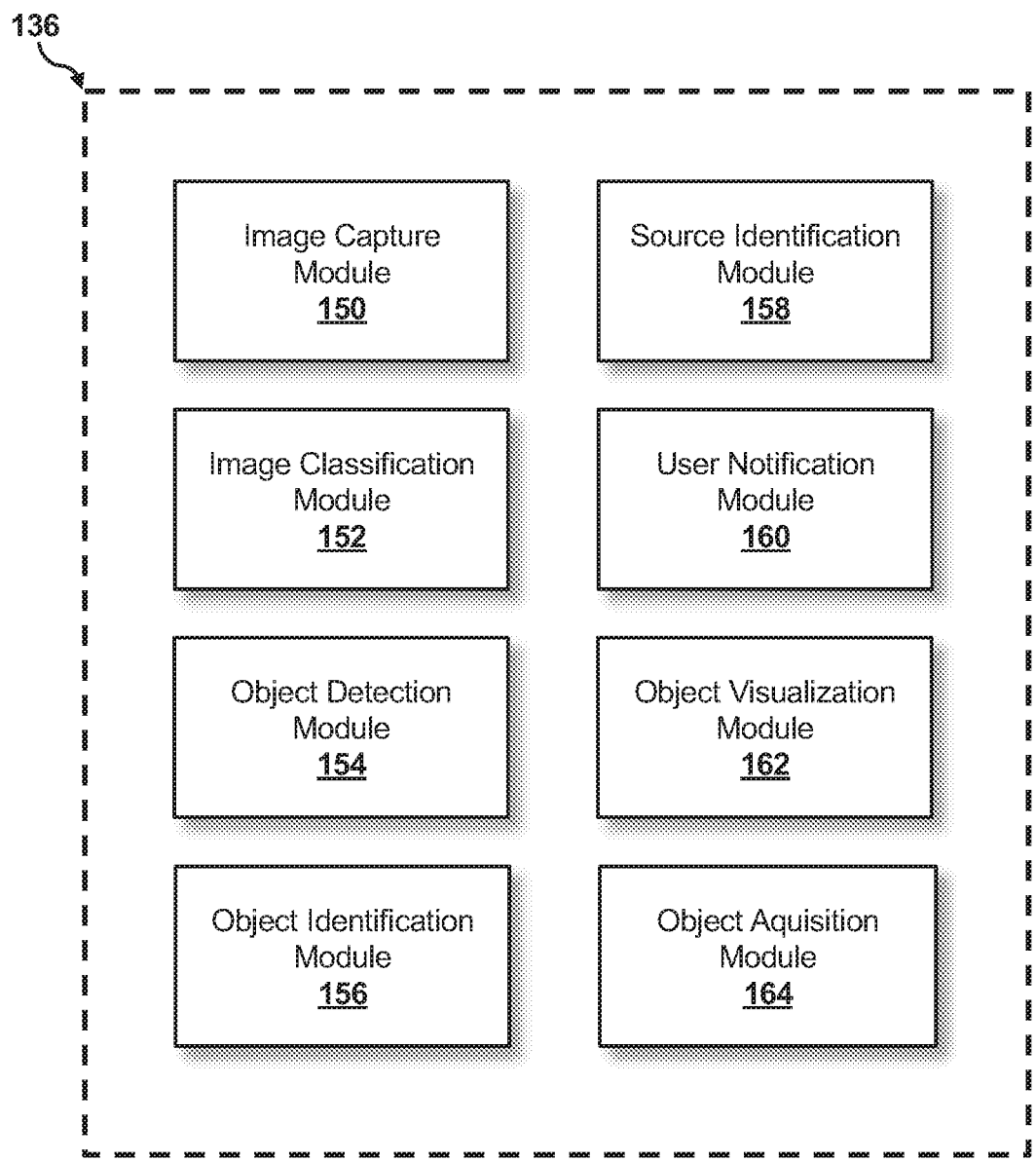

FIG. 1b illustrates example modules of the object detection and identification program 136. In an example embodiment, the object detection and identification program 136 may include eight modules: image capture module 150, image classification module 152, object detection module 154, object identification module 156, source identification module 158, user notification module 160, object visualization module 162, and object acquisition module 164.

The image capture module 150 receives the image data 114 captured from the display device 110 by the user device 120. In an embodiment of the invention, the image data 114 may be stored as the program data 134 on the program database 132. For example, but not limited to, the user device 120 may capture a screenshot of a movie or television program being displayed on the display device 110 using the user interface 122. The screenshot of the movie or television program being displayed on the display device 110 would then be sent to the server 130 where it would be received by the image capture module 150 of the object detection and identification program 136 via the user interface 122.

The image classification module 152 classifies the image data 114 received by the image capture module 150. The image classification module 152 may utilize machine algorithms to classify the image data 114 received by the image capture module 150 according to various metrics such as, but not limited to, scenes, geography, objects, people, faces, colors, food, text, etc. Further, the image classification module 152 may utilize metadata associated with the image data 114 received by the image capture module 150. The image data 144 may contain metadata including, but not limited to, the time the image data 114 was captured, the date the image data 114 was taken, and where the image data 114 was taken, etc. In an example embodiment, the image classification module 152 may utilize a machine algorithm to classify the image data 114 using landmarks and features contained within the image data 114. As a non-limiting example, the image data 114 may contain geographical images representing a country, a party, a beach, a mountain, etc., and a machine algorithm would be able to further classify the image data 114 according to the location the image data 114 was captured. The image classification module 152 may also utilize a machine algorithm to classify the image data 114 based on elements contain within the image data 114. Thus, the image classification module 152 may classify the image data 114 based on, for example, but not limited to, a store, a class room, a childcare facility room, or a sport field or facility featured in the image data 114, etc. Further, the image classification module 152 may utilize a machine algorithm to classify the image data 114 based on people or animals depicted in the image data 114 such as, but not limited to, an actor, an actress, a spokesperson, a mascot, gender, and age, etc.

The object detection module 154 detects objects contained within the image data 114 received by the image capture module 150. The object identification module 156 detects identifiable objects contained within the image data 114. Further, the object identification module 156 may categorize the identifiable objects such as, but not limited to automobiles, consumer electronics, clothing, personal accessories, shoes, jewelry, and food, etc. The object identification module 156 may use one or more object recognition techniques such as, but not limited to, saliency detection and/or visual quantification to detect and categorize objects contained within the image data 114 received by the image capture module 150. For example, the object recognition technology may be, but not limited to, a trained object detection model. The trained object detection model may be generated using neural networks, including, but not limited to, deep convolutional neural networks, and deep recurrent neural networks. Deep convolutional neural networks are a class of deep, feed-forward artificial neural networks consisting of an input layer, an output layer, and multiple hidden layers used to analyze images. Deep recurrent neural networks are artificial neural networks wherein the connections between the nodes of the network form a directed graph along a sequence used for analyzing linguistic data. The object detection module 154 may input the image data 114 into the convolutional neural networks to generate the trained object detection model. The trained object detection model detects unique objects contained within the image data 114. As another example, the object recognition technology may include, but it not limited to, a saliency detection algorithm such as SalNet. SalNet is a deep learning algorithm which automatically detects salients for a given image such as an object contained within the image data 114. The saliency of an image is the state or quality by which it stands out relative to its neighbors, i.e. localizing what people see when they view the image. Saliency detection is considered to be a key attentional mechanism that facilitates learning and survival by enabling organisms to focus their limited perceptual and cognitive resources on the most pertinent subset of the available sensory data. Saliency detection stresses on four types of features, namely color, luminance, texture, and depth. In embodiments of the present invention, saliency detection concentrates primarily on static saliency and objectness. Static saliency detection algorithms use different image features that allow detecting salient object of a non-dynamic image and objectness estimation seeks to propose a small set of bounding boxes according to the possibility of a complete object existing around a region.

The object identification module 156 identifies one or more individual objects detected by the object detection module 154. For example, the image data 114 may be, for example, but not limited to, a screenshot of a movie depicting an actor and the object identification module 156 may identify the individual pieces of clothing, jewelry, and/or accessories the actor is wearing or using in the image. The object identification module 156 may identify the one or more individual objects detected by the object detection module 154 by delaminating, i.e. separating, the image data 114 into retail, e.g. clothing, jewelry, personal electronics, and furniture, etc., and non-retail objects, e.g. people, animals, public and commercial services or facilities, etc. The object identification module 156 may utilize multi-modal learning to identify the one or more individual objects. For example, the multi-modal learning may include, but is not limited to, neural networks, background subtraction techniques, k-means algorithms, Barnes-Hut approximations, and/or t-Distributed Stochastic Neighbor Embedding (t-SNE), etc.

The source identification module 158 determines the location of the user device 120 and identifies one or more sources of the one or more objects based on the location of the user device 120. In some embodiments, a source of an object may be, but not limited to, a seller of the object, a lender of the object, a lessor of the object, a donor of the object, etc. In some embodiments, a source of an object may be, but is not limited to, a provider of the object and/or a service or facility related to the object. For example, a library or a bookstore may be sources for a book object. As another example, a sport facility, field, or court, or a seller of sporting equipment, may be sources for sport-related object, like a racket or ball. As yet another example, the objects identified as salient in a screenshot of pre-school aged children working on art projects in a daycare facility may include items of particular items of clothing or jewelry (e.g., shirts, pants, dresses, shoes, bracelets, necklaces, headwear) the children are wearing, the various art supplies (e.g., paper, crayons) the children are using, and the daycare room in which the children are present. According to various embodiments, sources of items of clothing may be sellers of children's clothing, sources of the daycare room may be commercial, religious, governmental, or non-profit providers of care for children. According to various embodiments, sources of art supply objects may be sellers of art supply objects or organizations that offer art classes or instruction. The source identification module 158 may for example, but not limited to, receive the location of the user device 120 from the user device 120, and/or determine the location based on the image data 114 received from the user device 120. The one or more sources may include, but are not limited to, e-commerce portals, retailers, churches, sports fields or facilities, libraries, schools, childcare providers, etc. The source identification module 158 may also identify the prices of, or other conditions or requirements for obtaining the one or more identified objects (or service) for each of the one or more sources. For example, the source identification module 158 may determine that a watch contained within the image data 114 is available for sale at two brick-and-mortar retailers near the user device 120 and through several e-commerce retailers such, but not limited to, Amazon®, and eBay®, etc. Further, the source identification module 158 may determine the price of the watch at each source. As another example, the source identification module 158 may determine any conditions on obtaining a loan of a book object from a library, e.g., a residency condition. As a further example, the source identification module 158 may determine any conditions on obtaining art classes or instruction for an art supply object, e.g., a minimum age or experience level condition. As a further example, the source identification module 158 may determine any conditions on obtaining daycare services from an organization in connection with a daycare room being determined salient, e.g., membership in a religious organization condition or a maximum household income condition. As a further example, the object detection module 156 may identify a book in the image data 114 and the source identification module 158 may determine sources of the book such as, but not limited to, a library, a bookstore, an electronic book store, an electronic book sharing website or application, etc. In further embodiments, the source identification module 158 may identify sources, such as, but not limited to, venues for viewing objects which cannot be acquired but may be viewed. For example, the image data 114 may be a picture of a defense aircraft in a national museum and the source identification module 158 may identify a museum where such defense aircrafts are on display.

The user notification module 160 generates a list of the one or more sources of the one or more objects based on the location of the user device 120 and presents the list to the user on the user device 120 via the user interface 122. The list may also include the prices of the one or more objects associated with the one or more sources. Thus, a user on the user device 120 may, at any point of time, access the list, look through the various offers, compare the best price against listed entries and place an order, as well choose to walk to a nearby retail outlet which has advertised of discounts and offers, based on the geographical location of the user device 120.

The object visualization module 162 receives a user image from the user device which may be stored in the program data 134 on the program database 132. The object visualization module 162 generates an image depicting the one or more identified objects on the user image. The object visualization module 162 may use neural networks such as, but not limited to convolutional neural networks (CNNs) to superimpose the identified object onto an image of the user stored as the program data 134 on the program database 132. For example, the identified object may be a piece of jewelry and the object visualization module 162 may generate an image depicting the necklace on a user of the user device 120 so that the user may visualize the object on themselves before acquiring.

The object acquisition module 164 receives a request from the user device 120 to acquire one of the one or more identified objects from an identified source and sends the request to the identified source. In an embodiment, the object acquisition module 164 may verify the acquisition request received from the user device 120. The object acquisition module 164 may verify the acquisition or purchase using an authentication mechanism, such as, but not limited to, a biometric sensor, a one-time password (OTP), a passcode, a password, etc. to confirm the placement of an acquisition request as well complete a payment transaction.

Figure 2A:
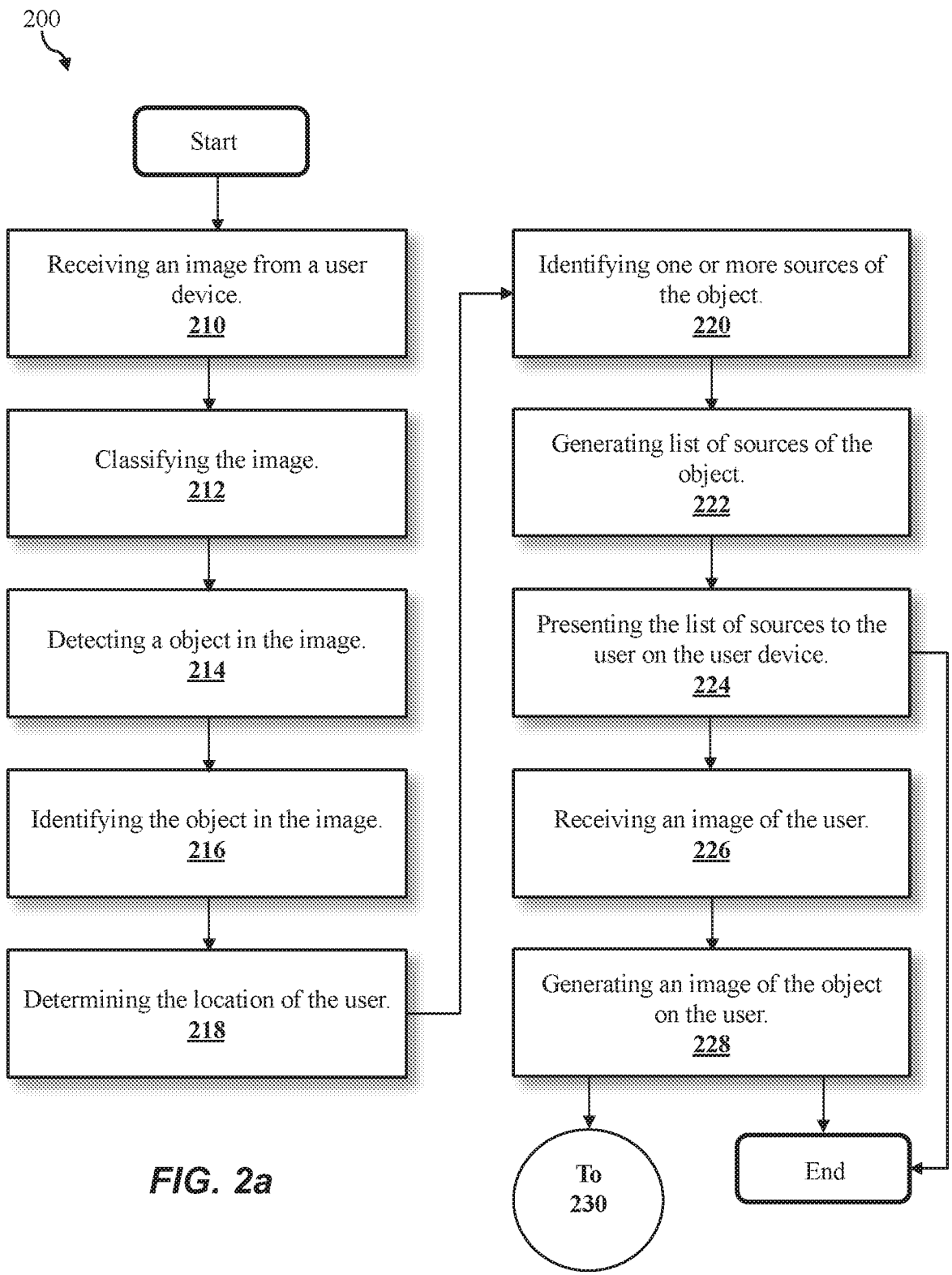
FIG. 2a is a flowchart illustrating an example method of object detection and identification in accordance with an embodiment of the invention.
Figure 2B:
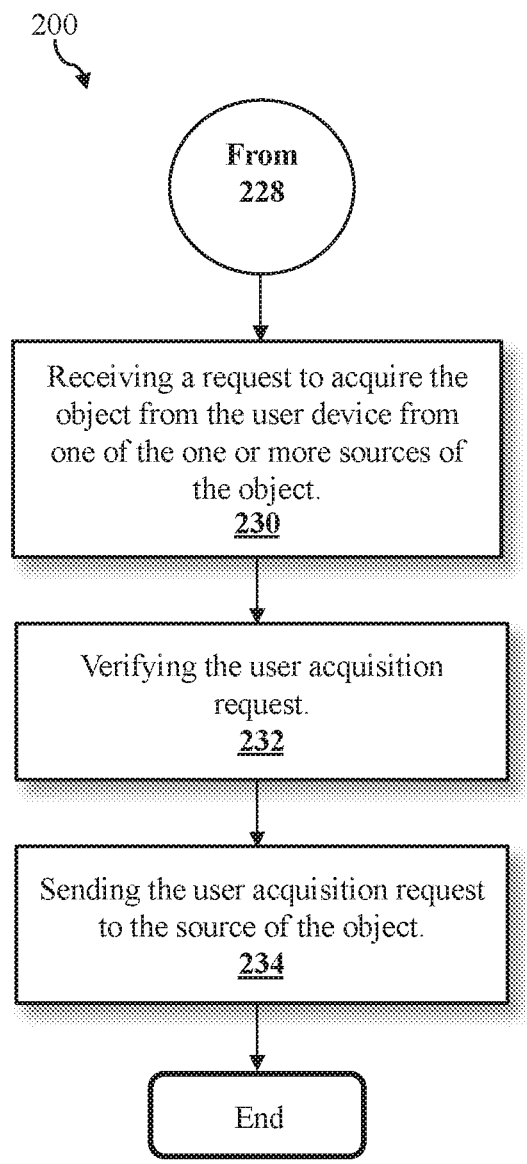
FIG. 2b is a flowchart illustrating an example method of object detection and identification in accordance with an embodiment of the invention.

Referring to FIGS. 2a-2b, a method 200 for object detection and identification is depicted, in accordance with an embodiment of the present invention.

Referring to block 210, the image capture module 150 receives the image data 114 captured from the display device 110 by the user device 120. Image capture is described in more detail above with reference to the image capture module 150 of FIG. 1b.

Referring to block 212, The image classification module 152 classifies the image data 114 received by the image capture module 150. Image classification is described in more detail above with reference to the image classification module 152 of FIG. 1b.

Referring to block 214, the object detection module 154 detects objects contained within the image data 114 received by the image capture module 150. Object detection is described in more detail above with reference to the object detection module 154 of FIG. 1b.

Referring to block 216, the object identification module 156 identifies one or more individual objects detected by the object detection module 154. Object identification is described in more detail above with reference to the object identification module 156 of FIG. 1b.

Referring to block 218, the source identification module 158 determines the location of the user device 120. Determining user location is described in more detail above with reference to the source identification module 158 of FIG. 1b.

Referring to block 220, the source identification module 158 identifies one or more sources of the one or more objects based on the location of the user device 120. Source identification is described in more detail above with reference to the source identification module 158 of FIG. 1b.

Referring to block 222, the user notification module 160 generates a list of the one or more sources of the one or more objects based on the location of the user device 120. Source list generation is described in more detail above with reference to the user notification module 160 of FIG. 1b.

Referring to block 224, the user notification module 160 presents the list to the user on the user device 120 via the user interface 122. Source list presentation is described in more detail above with reference to the user notification module 160 of FIG. 1b. Following the source list presentation, the object detection and identification program 136 may continue to block 224 or terminate.

Referring to block 226, the object visualization module 162 receives a user image from the user device which may be stored in the program data 134 on the program database 132. User image receipt is described in more detail above with reference to the object visualization module 162 of FIG. 1*b*.

Referring to block 228, the object visualization module 162 generates an image depicting the one or more identified objects on the user image. Object visualization is described in more detail above with reference to the object visualization module 162 of FIG. 1*b*. Following the object visualization, the object detection and identification program 136 may continue to block 230 or terminate.

Referring to block 230, the object acquisition module 164 receives a request from the user device 120 to acquire one of the one or more identified objects from an identified source. Object acquisition request is described in more detail above with reference to the object acquisition module 164 of FIG. 1*b*.

Referring to block 232, the object acquisition module 164 verifies the acquisition request received from the user device 120. Acquisition request verification is described in more detail above with reference to the object acquisition module 164 of FIG. 1*b*.

Referring to block 234, the object acquisition module 164 sends the request to the identified source. Acquisition request transmittal is described in more detail above with reference to the object acquisition module 164 of FIG. 1*b*.

Figure 3:
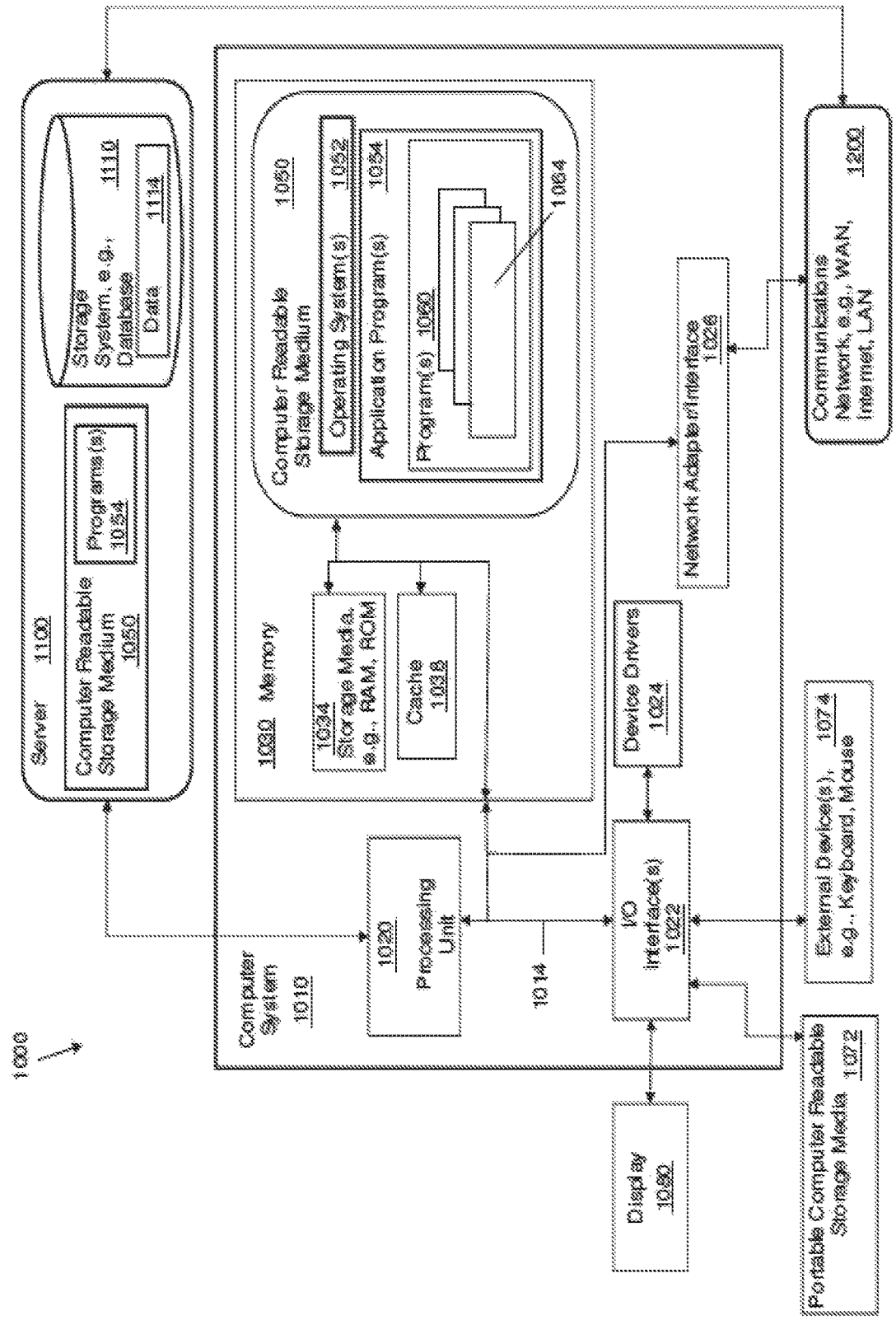
FIG. 3 is a block diagram depicting the hardware components of the object detection and identification system of FIG. 1, in accordance with an embodiment of the invention.

Referring to FIG. 3, a system 1000 includes a computer system or computer 1010 shown in the form of a generic computing device. The method 200 for example, may be embodied in a program(s) 1060 (FIG. 3) embodied on a computer readable storage device, for example, generally referred to as memory 1030 and more specifically, computer readable storage medium 1050 as shown in FIG. 3. For example, memory 1030 can include storage media 1034 such as RAM (Random Access Memory) or ROM (Read Only Memory), and cache memory 1038. The program 1060 is executable by the processing unit or processor 1020 of the computer system 1010 (to execute program steps, code, or program code). Additional data storage may also be embodied as a database 1110 which can include data 1114. The computer system 1010 and the program 1060 shown in FIG. 3 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in FIG. 3 as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, as shown in FIG. 3, the system 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media 1034 in the form of volatile memory, such as random access memory (RAM), and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention. As such, the computing device in FIG. 4 becomes specifically configured to implement mechanisms of the illustrative embodiments and specifically configured to perform the operations and generated the outputs of described herein for determining a route based on a user's preferred environmental experiences.

The methods 200 (FIG. 2), for example, may be embodied in one or more computer programs, generically referred to as a program(s) 1060 and can be stored in memory 1030 in the computer readable storage medium 1050. The program 1060 can include program modules 1064. The program modules 1064 can generally carry out functions and/or methodologies of embodiments of the invention as described herein. For example, the program modules 1064 can include the modules 150-164 described above with reference to FIG. 1*b*. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
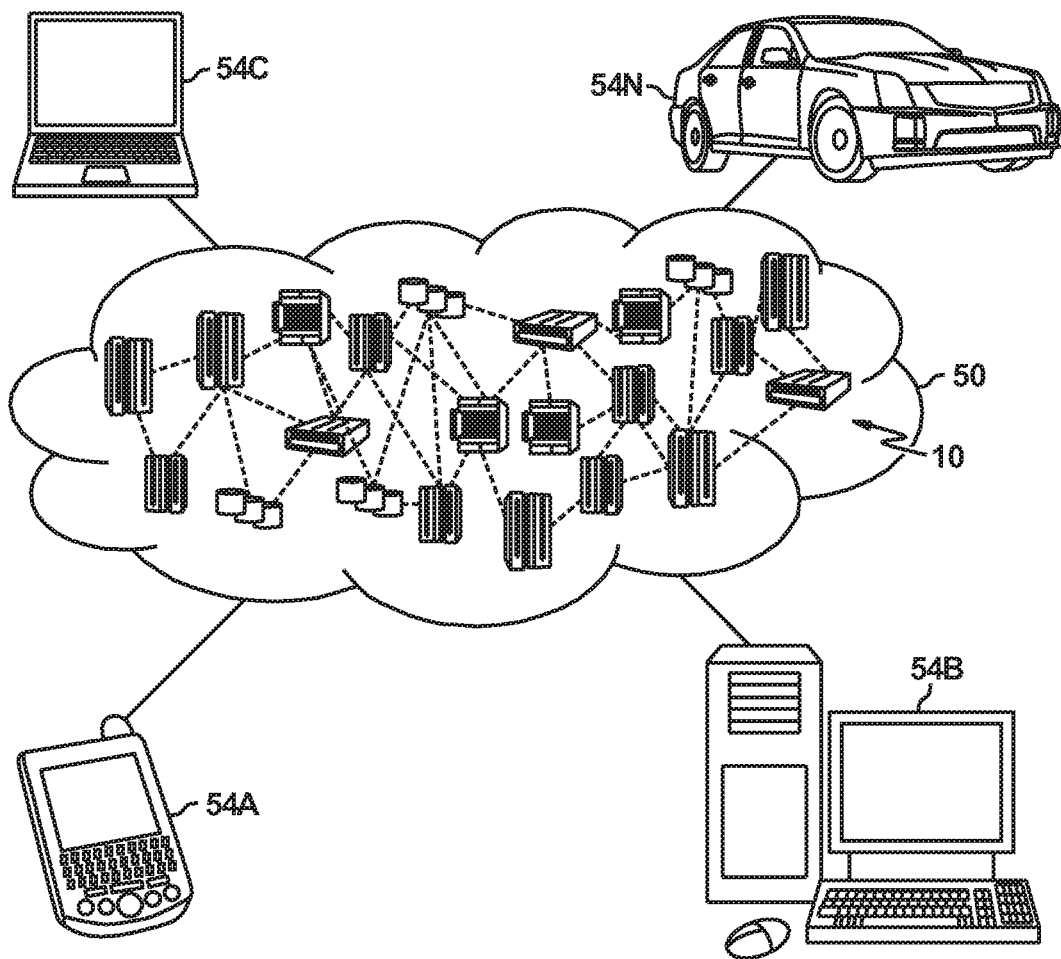
FIG. 4 illustrates a cloud computing environment, in accordance with an embodiment of the invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
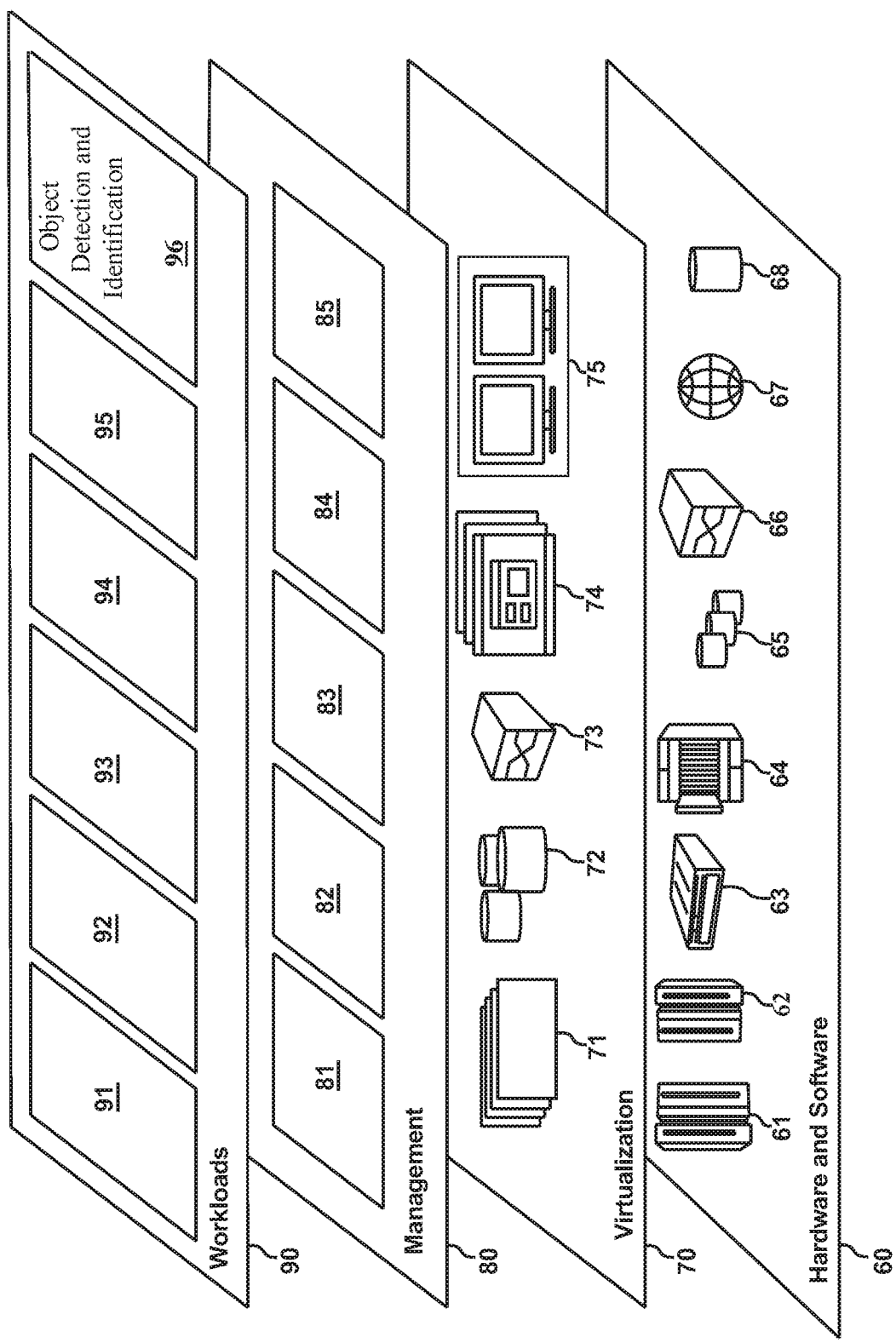
FIG. 5 illustrates a set of functional abstraction layers provided by the cloud computing environment of FIG. 4, in accordance with an embodiment of the invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and object detection and identification 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

What is claimed is:

1. A method for object detection and identification, the method comprising:
   receiving, by a computing device, an image from a user device, wherein the image is screenshot captured by the user device from a display;

classifying, by the computing device, the image, wherein the image is classified based on features present in the image;

detecting, by the computing device, one or more objects contained within the image, wherein the one or more objects is or are delaminated into retail objects and non-retail objects; and wherein each of the one or more the objects is a salient object;

identifying, by the computing device, each of the one or more objects detected in the image, wherein each of the one or more objects is identified using multi-modal learning techniques, and wherein the multi-modal learning techniques comprise a Barnes-Hut approximation; and identifying, by the computing device, one or more sources resulting in identified sources of each of the one or more objects in the image, wherein the identified sources include one or more locations where the retail objects can be acquired, and one or more venues where the non-retail objects can be viewed.

2. The method as in claim 1, wherein identifying, by the computing device, one or more sources of each of the one or more objects in the image further comprises:

determining, by the computing device, a location of the user device;

generating, by the computing device, a list of sources of each of the one or more objects based on the location of the user device; and presenting, by the computing device, the list of sources of the one or more objects to a user on the user device, thereby allowing the user to compare respective conditions and locations for each of the one or more objects identified within the received image.

3. The method as in claim 1, further comprising:

receiving, by the computing device, a second image, the second image being an image of a user, from the user device; and generating, by the computing device, a second image of the user with at least one of the one or more objects, wherein the second image is generated using at least one convolutional neural network.

4. The method as in claim 1, further comprising:

receiving, by the computing device, a request to acquire a retail object from the user device from one of the one or more sources;

verifying, by the computing device, the request to acquire the retail object; and sending, by the computing device, the request to acquire the retail object to the source.

5. The method as in claim 1, wherein the screenshot is captured from the display displaying at least one of the group consisting of: a movie, a television program, and a commercial.

6. The method as in claim 1, wherein each of the one or more objects is detected using a saliency detection algorithm.

7. The method as in claim 1, wherein the multi-modal learning techniques further comprise at least one of the group consisting of: a neural network, a convolutional neural network (CNN), a background subtraction technique, a k-means algorithm, and a t-Distributed Stochastic Neighbor Embedding (t-SNE).

8. The method as in claim 4, wherein the request to acquire the retail object is verified using a biometric sensor on the user device.

\* \* \* \* \*